Aug. 22, 1944.　　　T. A. BAKER　　　2,356,143
FLUID REGULATING DEVICE
Filed June 25, 1941　　　3 Sheets-Sheet 2
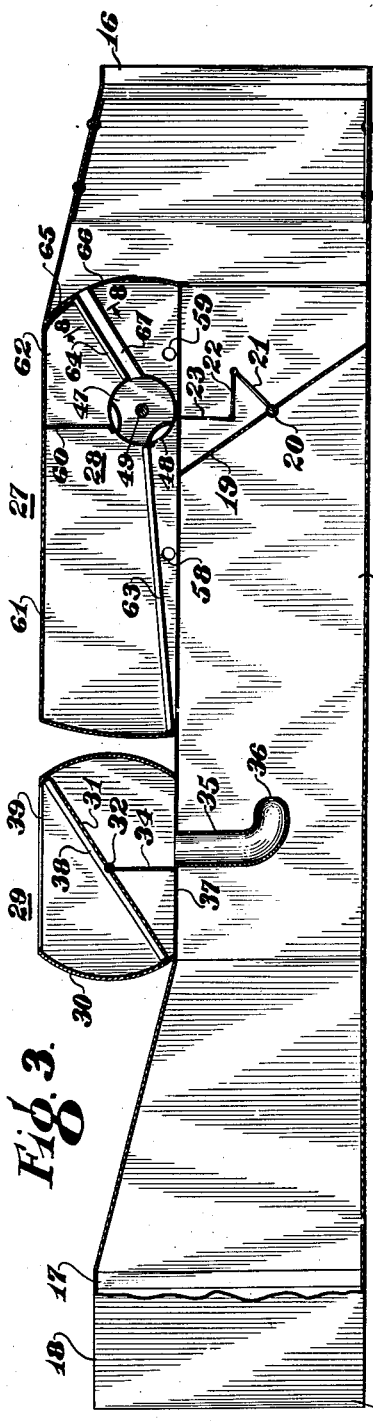
INVENTOR.
*Thomas A. Baker.*
BY
*Hoodling and Krost* attys

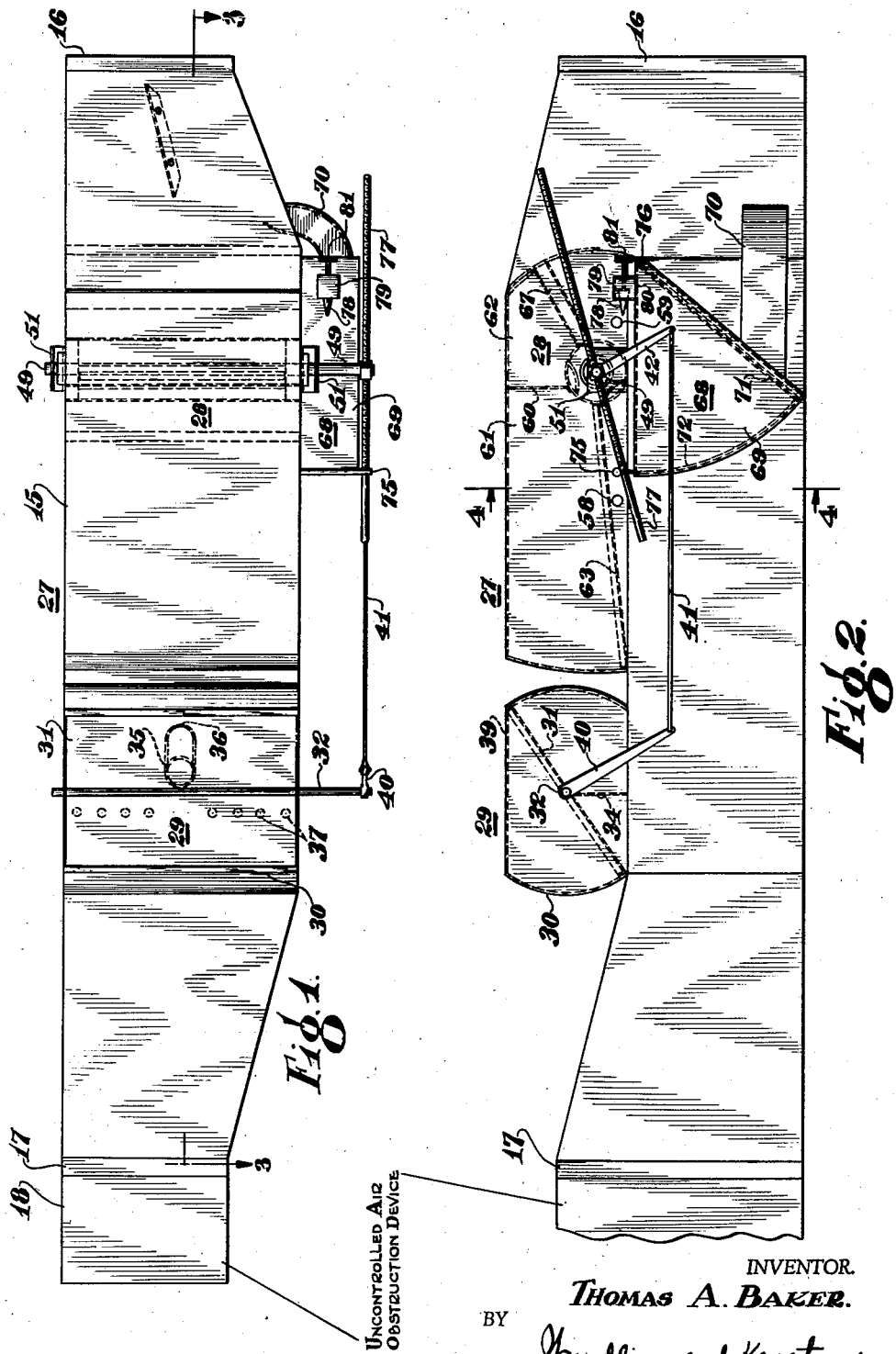

INVENTOR.
THOMAS A. BAKER.

Patented Aug. 22, 1944

2,356,143

UNITED STATES PATENT OFFICE 2,356,143

FLUID REGULATING DEVICE

Thomas A. Baker, Logansport, Ind.

Application June 25, 1941, Serial No. 399,602

8 Claims. (Cl. 137—152.5)

My invention relates in general to a fluid regulating device and more particularly to a mechanism for regulating the flow of air.

My invention will be described in connection with an uncontrolled air obstruction device. For the purpose of this application, an uncontrolled air obstruction device comprises any arrangement wherein the resistance to the flow of air therethrough is uncontrolled such, for example, as the flow of air through the coal bed of a furnace or the flow of air through a charged cupola. Although my device will be described in conjunction with an uncontrolled air obstruction device, it is to be clearly understood that it may be employed for other types of devices.

An object of my invention is the provision of delivering a substantially constant volume of air to an uncontrolled air obstruction device.

Another object of my invention is the provision of means restricting the flow of air in advance of the delivery of the air to the uncontrolled air obstruction device so that the resistance set up to the flow of air by my invention varies substantially inversely with the uncontrolled resistance set up to the flow of air in the uncontrolled air obstruction device, with the result that the total resistance to the flow of air is maintained substantially at a constant value.

Another object of my invention is the provision of means governing the operation of a valve which sets up resistance to the flow of air substantially in accordance with the difference between the total pressure head and the static pressure head of the air in communication with the uncontrolled air obstruction device.

Another object of my invention is the provision of means causing a follower member to follow the movements of a locating element.

Another object of my invention is the provision of a fluid operated device which follows the movements of a locating device.

Another object of my invention is the provision of a pilot valve arrangement having two floating parts wherein one of the floating parts designated as a follower moves in accordance with a locating device designated as a locating element.

Another object of my invention is the provision of a valve for controlling the flow of air and for utilizing the air in an air actuating device for controlling the valve.

Another object of my invention is the provision of means multiplying the power of a pressure responsive device by utilizing the air to operate an air operated device governed by the pressure responsive device and then transmitting the movements of the air operated device to a valve which controls the flow of the air from an air supply source to an uncontrolled air obstruction device.

Another object of my invention is the provision of weight means for causing the valve to return to its closed position when the air source is shut off.

Another object of my invention is the provision of delayed action means for determining the rate of the opening of the valve after the air from the air source is again reestablished.

Other objects and a fuller understanding of my invention may be had by referring to the following description and claims, taken in conjunction with the accompanying drawings, in which like parts are designated by like reference characters, and in which:

Figure 1 is a plan view of an air regulating mechanism embodying the feautres of my invention;

Figure 2 is a side elevational view of my air regulating device as shown in Figure 1;

Figure 3 is a longitudinal cross-sectional view of my air regulating device taken along the line 3—3 of Figure 1;

Figure 4 is a transverse cross-sectional view of my air regulating device taken along the line 4—4 of Figure 2;

Figure 5 is an enlarged fragmentary view of Figure 4 showing principally a longitudinal side view of a pilot valve mechanism embodying the features of my invention;

Figure 6 is a perspective view showing the inside part of my pilot valve arrangement;

Figure 7 is a cross-sectional view taken along the line 7—7 of Figure 5 and showing principally the cross-section of my pilot valve arrangement with the other parts removed;

Figure 8 is a cross-sectional view taken along the line 8—8 of Figure 3 and shows the duct arrangement leading to my pilot valve arrangement.

Figure 9:
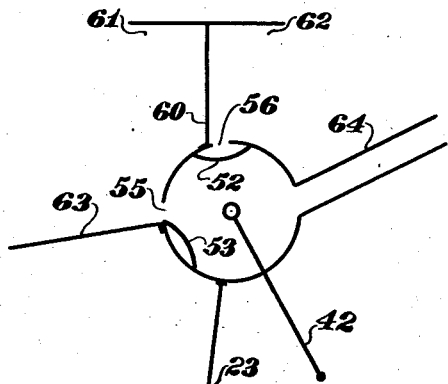
Figures 9 to 13, inclusive, show relative operating positions between the two parts of my pilot valve assembly.

With reference to Figures 1, 2 and 3 of the drawings, my fluid regulating device comprises a main housing 15 having an inlet 16 and an outlet 17. The inlet 16 may be connected to any suitable source of air supply such, for example, as a fan or other air moving means. The air outlet 17 is arranged to be connected in communication with an uncontrolled air obstruction device indicated generally by the reference character 18. The resistance which the uncontrolled air obstruction device offers to the flow of air is uncontrolled and thus may vary from moment to moment depending upon the conditions prevailing within the uncontrolled air obstruction device. Mounted within the main housing 15 is a valve 19 which may be pivotally mounted in the sides of the housing 15 by pivot means 20. The valve 19 may be pivotally operated by means of actuating links 21 and 22 and an actuating arm 23. When the lower end of the actuating arm 23 moves to the left the valve 19 opens and when the lower end of the actuating arm 23 moves to the right the valve closes.

The valve 19 is operated by an air operated means indicated generally by the reference character 27. The air operated means 27 is governed by a pilot valve means indicated by the reference character 28 and controlled by a pressure responsive device indicated by the reference character 29. In operation, the pressure responsive device controls the pilot valve means 28 and the pilot valve means 28 in turn governs the air operated means 27 which actuates the main valve 19 for controlling the flow of the air through the housing 15.

The pressure responsive device 29 comprises an enclosure or compartment 30 having a pivotally mounted vane 31 therein which makes a relatively close fit within the side walls of the enclosure 30. The vane 31 may be pivotally mounted upon a pivot shaft 32 which is supported in the side wall of the enclosure 30. A dividing plate 34 separates the compartment below the vane 32 into two parts. The compartment to the left of the dividing plate 34 is connected to communicate with the inside of the main housing 15 through a plurality of openings 37. The compartment to the right of the partition or dividing plate 34 is connected to the inside of the main housing 15 by an impact tube 35 having an opening 36 in its forward end thereof. Accordingly, the compartment to the left of the dividing plate 34 is exposed to the static pressure of the air within the housing 15 and the compartment to the right of the dividing plate 34 is exposed to the total pressure of the air within the housing 15. The total pressure is equal to the static pressure plus the velocity pressure resulting from the flow of the air past the impact tube 35. The pivotally mounted vane 31 within the enclosure 30 is provided with cupped edges 38 in order to increase the effective leakage resistance to the air which tends to escape around the edges of the vane. The top of the enclosure 30 is provided with an opening 39. The movement of the pivotally mounted vane 31 is responsive to the difference between the total pressure head and the static pressure head of the air in communication with the outlet 17 of the main housing 15. As shown in Figure 2, the movements of the pivotally mounted vane 31 is transmitted to the pilot valve means 28 through a lever arm 40 connected to the pivot shaft 32, a connecting link 41 and a lever arm 42 connected to the pivot valve means 28.

With reference to Figures 3, 5, 6 and 7, my pilot valve means 28 comprises an inside locating part 47 and an outside follower part 48. The locating part 47 and the follower part 48 are each movable relative to each other and provide for governing the air operated means 27. The inside locating part is mounted upon a shaft 49 and comprises two spaced end plates 50 secured to the shaft. The end plates 50 are circular except for two arcuate portions removed therefrom into which are mounted channel members 52 and 53. The outside ends of the shaft 49 are supported in bearings 51 carried by the side walls of the main housing 15. The outside follower part 48 is in the form of a cylinder and each end thereof is pivotally supported in bearings 54 carried by the side walls of the main housing 15. The bearings 51 are outside the bearings 54 and are such that the inside locating part 47 and the outside follower part 48 are pivotally mounted relative to each other. The outside follower part 48 is provided with two longitudinal openings 55 and 56 which cooperate with the channel members 52 and 53 for controlling the flow of air to operate the air operated means 27.

The air operated means 27 is divided into two chambers 61 and 62 by a partition 60 that extends upwardly from the outside of the follower part 48. Mounted within the chamber 61 is a vane 63 which has its right-hand end secured to the outside follower part 48. A vane 64 is mounted within the chamber 62 and is likewise connected to the outside follower part 48. As shown in Figures 3 and 8, the vane 64 is of a hollow construction to provide a duct 67 which conducts air from the air inlet 16 to the inside of the follower part 48 of the pilot valve means. As illustrated in Figure 3, the right-hand end of the vane 64 is provided with an upwardly turned shroud 65 and a downwardly turned shroud 66. As the vane 64 moves up and down, the shrouds 65 and 66 move therewith and provide a relatively air-tight enclosure for the chamber 62. The vanes 63 and 64 are likewise provided with cupped edges in order to make the effective resistance to the leakage of the air around the edges thereof as much as possible. The compartments under the vanes 63 and 64 are open to atmosphere with openings 58 and 59, respectively.

When the air is shut off from the air inlet 16, that is to say when no air is passing through the housing 15, the weight of the vane 63 is arranged to rotate the outside follower part 48 and actuate the actuating arm 23, which is secured thereto, in a counter-clockwise direction for closing the main valve 19. Also, the inside locating part 47 for the pilot valve means is arranged to be rotated in a counter-clockwise direction when the air is shut off from the air inlet 16. The arrangement for turning the inside locating part 47 of the pilot valve in a counter-clockwise direction is associated with a delayed starting device indicated generally by the reference character 68 and is mounted upon the side of the main housing 15, see Figures 1, 2 and 4. The delayed starting device 68 comprises a substantially triangular compartment 69 having an air duct 70 leading over to the side of the main housing 15 in communication with the air inlet 16. Pivotally mounted within the compartment 69 is a vane 71 having its upper end pivotally mounted by means of a pivot 76 in the side of the compartment 69. The lower left-hand end of the vane 71 is provided with an arcuate shroud 72 which lies closely to the inside surface of the arcuate end of the compartment 69. The upper end of the shroud 72 extends through the top of the compartment 69 and the upper end thereof is provided with a cross rod or engaging rod 75 which extends out over a threaded rod 77 which is threadably secured to the shaft 49 of the inside locating part 47 of the pilot valve arrangement. The opening in the top of the compartment 69 through which the shroud 72 extends makes a relatively good fit with the shroud. As shown in Figure 4, the shroud 72 is provided with an irregularly shaped opening 73 which is relatively large at the top, being substantially rectangular in form, and which becomes small at a restriction 74 after which it gradually expands to an outline that approaches the size of the shroud 72. When the air is shut off from the air inlet 16, the pivotally mounted vane 71 swings downwardly and the engaging rod 75 rests upon the top of the threaded rod 77 and the weight of the entire arrangement is such that the inside locating part 47 of the pilot valve arrangement is turned in a counterclockwise direction. The escapement of the air from the compartment 69 above the vane 71 out through the opening 73 governs the upward swinging movement of the vane 71 as air pressure is applied to the air inlet 16 of the main housing. The escaping of the air from the compartment 69 above the vane 71 is further regulated by an adjustable opening valve 78 mounted on top of the compartment 69. In flowing from the compartment 69 above the vane 71 the air first flows through an opening 80 into a box compartment 79 and then out through the adjustable valve opening 78. The flow of the air therethrough may be regulated by turning the adjustment screw 81 which varies the opening of the adjustable valve 78.

Figure 10:
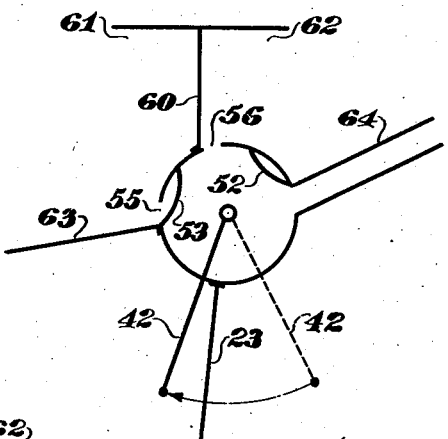
Figure 11:
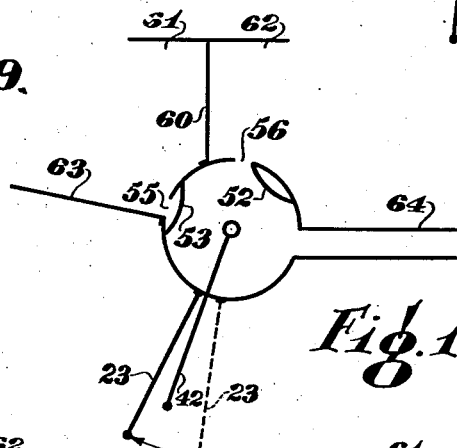

In explaining the operation of my device let it be assumed that the air supplied to the air inlet 16 is shut off. In this event, the air vane 71 within the compartment 69 rotates the inside locating part 47 of the pilot valve arrangement in a counterclockwise direction and it assumes the position as shown in Figures 7 and 9 of the drawings. The weight of the vane 63 of the air operated means 27 also actuates the outside follower part 48 of the pilot valve arrangement in a counterclockwise direction and it assumes the position as shown in Figures 1, 7 and 9. Accordingly, the main valve 19 is closed. Now, let it be assumed that air is supplied to the air inlet 16 in the main housing 15. The air under pressure in the air inlet 16 flows to the inside of the follower part 48 of the pilot valve through the duct 67, after which air flows through the opening 55 in the follower part 48 and out into the chamber 61 of the air operated means 27. The air pressure acting upon the vane 63 of the chamber 61 constrains the follower part 48 of the pilot valve in a counter-clockwise direction and thus further constrains the main valve 19 in a closed position. In the position shown in Figures 3 and 9 of the pilot valve, the compartment 62 of the air operated means is connected to atmosphere through the opening 56 and the channel member 52 which leads to the end compartments of the pilot valve and then out through openings 57 in bearings 54 upon the housing 15 to atmosphere, see Figure 5. Since the main valve 19 is constrained in a closed position by the air pressure acting downwardly upon the vane 63 and the pressure responsive device 29 remains inactive and continues to remain inactive until the valve 19 opens through the action of the delayed starting device 68, which is set in operation by air flowing through the air duct 70 from the air inlet 16. The air pressure acting upon the underneath side of the vane 71 will start to turn the vane in a clockwise direction about the pivot point 76. The vane 71 will suddenly rise for a relatively short distance just as soon as air pressure is applied thereunderneath because the entrapped air above the vane 71 is permitted to escape rapidly through the opening 73 which is relatively large as indicated by the rectangular outline in Figure 4 when the vane 71 is in its lowermost position. Just as soon as the air pressure raises the vane 71, the threaded rod 77, by reason of its weight adjustment, will turn the inside locating part 47 of the pilot valve in a clockwise direction. When the restriction 74 of the opening 73 reaches the opening through which the shroud 72 passes on top of the compartment 69, the movement of the vane 71 is arrested and from thereon the vane 71 rises slowly with a gradually increased speed resulting from the gradual enlargement of the opening 73 as the vane 71 rises. The vane 71 continues to rise until it reaches its uppermost position during which time the threaded rod 77 tends to turn in a clockwise direction to move the inside part 47 of the pilot valve. As the vane 71 approaches its uppermost position, the engaging rod 75 leaves the threaded rod 77, after which the threaded rod 77 and the pressure responsive device 29 function to govern the location of the locating element 47 of the pilot valve. As the inside locating part 47 of the pilot valve turns in a clockwise direction, it approaches the position shown in Figure 10, which shows the compartment 62 of the air operated means 27 connected to the air inlet 16 and the compartment 61 connected to atmosphere. The air pressure acting upon the vane 64 operates to turn the outside follower part 48 of the pilot valve in a clockwise direction to open the main valve 19. This is shown in Figure 11. After the main valve 19 is open, the pressure responsive device 29 becomes operative and regains control over the movement of the inside locating part 47 of the pilot valve. Consequently, the inside locating part 47 of the pilot valve is turned in accordance with the difference in the total pressure head and the static pressure head of the fluid or air in rear of the main valve 19 and in communication with the air outlet 17. The threaded rod 77 is adjusted to operate as a weight to turn the inside locating part 47 of the pilot valve in a clockwise direction and opposes the counterclockwise turning action of the pressure responsive device 29 resulting from an increase in the flow of the air through the housing 15. In operation, the balance between the weight of the threaded rod 77 and the air force acting on the vane 31 determines the location of the inside locating part 47 of the pilot valve. The operation of my pilot valve means is such that the outside follower part 48 functions to follow the movements of the inside locating part 47. The following action of the follower part 48 results from the balancing action of the fluid pressure acting upon the vanes 63 and 64 of the air operated device wherein the air within the two compartments or chambers 61 and 62 assume a stabilizing action by reason of the fact that the inside locating part 47 and the outside follower part 48 are each free to move relative to each other. In the event that the force acting upon either one of the vanes 63 or 64 tends to predominate over the force acting upon the other vane then the longitudinal openings 55 and 56 move relative to the channel members 52 and 53 so as to reduce the predominant action, with the result that the outside follower part is stabilized at a position determined by the movement of the locating part 48. Consequently, in operation the position of the main valve 19 and the vanes 63 and 64 of the air operated means 27 move in accordance with the movement of the vane 31 of the pressure responsive device 29. In the event that the uncontrolled air obstruction device 18 offers very little resistance to the flow of air, then the pivotally mounted vane 31 is biased in a counter-clockwise direction since the air velocity passing through the main housing 15 tends to momentarily increase. The turning of the pivotally mounted vane 31 in a counter-clockwise direction turns the inside locating part 47 in a counter-clockwise direction, with the result that the outside follower part 48 turns in a counter-clockwise direction to close the main valve 19. The closing of the main valve 19 reduces the flow of the air so that the total amount of air delivered is maintained substantially constant. The operation just described is in the reverse order in the event that the resistance to the flow of the air through the uncontrolled air obstruction device increases. My device continues to operate as explained above to maintain the flow of the fluid to the uncontrolled air obstruction device constant under all operating conditions.

Figure 12:
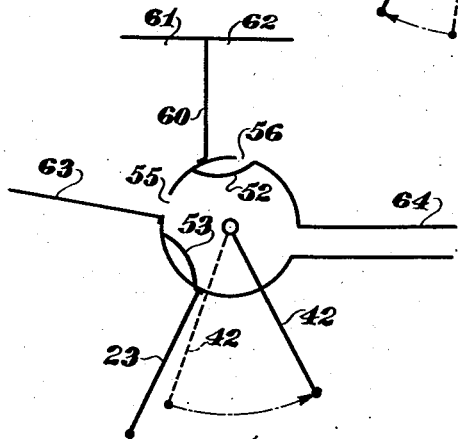
Figure 13:
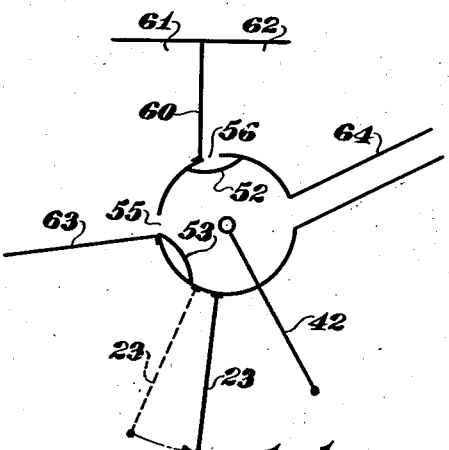

When the air is shut off from the air inlet 16, the weight of the vane 71 of the delayed starting device actuates the threaded rod 77 and the inside locating part 47 of the pilot valve in a counter-clockwise direction as shown in Figure 12; after which the outside follower part 48 likewise moves in a counter-clockwise direction as shown in Figure 13, being the same position as shown in Figure 9 for closing the main valve 19. The valve remains in the closed position until air is again reestablished in communication with the air inlet 16.

The adjustable valve 78 on top of the delayed starting device 68 is arranged to control or vary the starting action of the entire arrangement. The rising of the vane 71 within the delayed starting device 68 functions as a dashpot to give desirable starting characteristics and the valve 78 may be operated to complement the operation effected by the opening 73 in the shroud 72.

In conclusion, it may be summarized that I have produced an air regulating device which when connected in series with an uncontrolled air obstruction device operates to give a substantially constant flow of air and further the air is used as power means for operating the air operating means 27 under the control of the pilot valve means 28 governed by the pressure responsive device 29.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A follower mechanism adapted to be connected in communication with a fluid source comprising, in combination, a follower valve casing comprising a longitudinal tubular body, bearing means pivotally supporting the ends of the follower valve casing, a first and a second vane connected to the follower valve casing and extending therefrom in opposite directions, a partition positioned longitudinally of and closely adjacent the follower valve casing between the first and second vane, a first fluid chamber including the first vane, the partition and the portion of the follower valve casing between the first vane and the partition, a second fluid chamber including the second vane, the partitioned and the portion of the follower valve casing between the second vane and the partition, said follower valve casing having first port means for connecting the first fluid chamber in communication with the fluid source and a second port means for connecting the second fluid chamber in communication with the fluid source, a locating valve element pivotally movable within the follower valve casing and having fluid control means, in cooperation with the port means of the said casing for regulating the flow of the fluid from the said source to the chambers and from the chambers to atmosphere, said follower valve casing being movable with the movable vanes and movable relative to the locating valve element, said locating valve element and said follower valve casing defining valve parts which, under a first set of relative conditions between the two parts, admit fluid to the first fluid chamber and render it active to operate the first vane in one direction while venting the second fluid chamber to atmosphere and which, under a second set of relative conditions admit fluid to the second fluid chamber and render it active to operate the second vane in the opposite direction while venting the first fluid chamber, and which under a third set of relative conditions vent both of the fluid chambers to render them both inactive, the pressure of the fluid in the active chamber, as regulated by the follower valve casing and the locating valve element, causing the vanes and the follower valve casing to follow the locating valve element, and conduit means movable with one of the vanes for connecting the follower valve casing in fluid communication with the fluid source.

2. A mechanism for delivering a substantially constant volume of air to an uncontrolled air obstruction device comprising, in combination, a housing for directing a supply of air to the obstruction device, a valve in the housing for regulating the flow of air through the housing, air operated means for actuating the said valve, pressure means responsive to the difference between the total pressure head and the static pressure head of the air between the valve and the obstruction device to govern the air operated means and the valve to deliver a substantially constant volume of air through the housing, weight means opposing the said pressure means and tending to influence the air operated means for opening the valve, and delayed action means opposing the initial movements of the weight means, and the ready response of the pressure means.

3. A follower mechanism adapted to be connected in communication with a fluid source comprising, in combination, fluid operated means having two fluid chambers and a movable member responsive to the pressure of the fluid therein, an oscillatory follower valve casing having port means therein for connecting the fluid chambers in communication with the fluid source, an oscillatory locating valve element movable within the said casing and having fluid control means, in cooperation with the port means of the said casing for regulating the flow of the fluid from the said source to the chambers and from the chambers to atmosphere, said follower valve casing being movable with the movable member and movable relative to the locating valve element, the pressure of the fluid in the two chambers, as regulated by the follower valve casing and the locating valve element, causing the movable element and the follower valve casing to follow the locating valve element, and conduit means movable with one of the movable members for connecting the follower valve casing in fluid communication with the fluid source.

4. A follower mechanism governed by fluid pressure from a fluid source comprising, in combination, a housing including two spaced side walls, a follower valve casing comprising a hollow rotor having a first port means and a second port means annularly spaced from each other, bearing means rotatively supporting the ends of the rotor in the said side walls, a first and a second vane connected to the rotor with each vane extending therefrom and between the side walls, a partition positioned between the side walls and longitudinally of and closely adjacent the rotor between the said two annularly spaced port means, means to enclose a portion of the housing to define a first fluid chamber including the first vane, one side of the partition, a portion of the side walls and the portion of the rotor between the first vane and the partition, means to enclose another portion of the housing to define a second fluid chamber including the second vane, the other side of the partition, another portion of the side walls and the portion of the rotor between the second vane and the partition, said rotor being in fluid communication with the fluid source with the first port means communicating with the first fluid chamber and with the second port means communicating with the second fluid chamber, a locating valve element turnably mounted within the rotor and having fluid control means, in cooperation with the port means of the rotor for regulating the flow of the fluid from the source to the chambers and from the chambers to atmosphere, said rotor following the movable vanes and being movable relative to the locating valve element, said locating valve element and said rotor defining valve parts which, under a first set of relative conditions between the two parts, admit fluid to the first fluid chamber and render it active to operate the first vane in one direction while venting the second fluid chamber to atmosphere and which, under a second set of relative conditions, admit fluid to the second fluid chamber and render it active to operate the second vane in the opposite direction while venting the first fluid chamber and which under a third set of relative conditions vent both of the fluid chambers to render them both inactive, the pressure of the fluid in the active chamber, as regulated by the rotor and the locating valve element, causing the vanes and the rotor to follow the locating valve element, and conduit means movable with one of the vanes for connecting the follower valve casing in fluid communication with the fluid source.

5. A follower mechanism governed by fluid pressure from a fluid source comprising, in combination, a housing including two spaced side walls, a follower valve casing comprising a hollow rotor having a first port means and a second port means annularly spaced from each other, bearing means rotatively supporting the ends of the rotor in the said side walls, a first and a second vane connected to the rotor with each vane extending therefrom and between the side walls, a partition positioned between the side walls and longitudinally of and closely adjacent the rotor between the said two annularly spaced port means, means to enclose a portion of the housing to define a first fluid chamber including the first vane, one side of the partition, a portion of the side walls and the portion of the rotor between the first vane and the partition, means to enclose another portion of the housing to define a second fluid chamber including the second vane, the other side of the partition, another portion of the side walls and the portion of the rotor between the second vane and the partition, means movable with the rotor in fluid communication with the fluid source with the first port means communicating with the first fluid chamber and with the second port means communicating with the second fluid chamber, a locating valve element turnably mounted within the rotor and having fluid control means, in cooperation with the port means of the rotor for regulating the flow of the fluid from the source to the chambers and from the chambers to atmosphere, said rotor following the movable vanes and being movable relative to the locating valve element, said locating valve element and said rotor defining valve parts which, under a first set of relative conditions between the two parts, admit fluid to the first fluid chamber and render it active to operate the first vane in one direction while venting the second fluid chamber to atmosphere and which, under a second set of relative conditions, admit fluid to the second fluid chamber and render it active to operate the second vane in the opposite direction while venting the first fluid chamber and which under a third set of relative conditions vent both of the fluid chambers to render them both inactive, the pressure of the fluid in the active chamber, as regulated by the rotor and the locating valve element, causing the vanes and the rotor to follow the locating valve element, and conduit means movable with one of the vanes for connecting the follower valve casing in fluid communication with the fluid source.

6. A follower mechanism governed by fluid pressure from a fluid source comprising, in combination, fluid operated means having two fluid chambers, movable means having two surfaces in which a surface is exposed to the fluid pressure in each of the fluid chambers, valve means having two relatively movable parts for regulating the flow of the fluid from the said source to the chambers and from the chambers to atmosphere, one of said valve parts being a locating element and the other of said valve parts being mechanically connected to and movable with the movable means, said valve parts under a first set of relative conditions between the two parts admitting fluid to one of said fluid chambers and rendering it active to operate the movable means in one direction while venting the other fluid chamber to atmosphere and under a second set of relative conditions admitting fluid to the said other fluid chamber and rendering it active to operate the movable means in the opposite direction while venting the said one of said fluid chambers to atmosphere and under a third set of relative conditions venting both of the fluid chambers to atmosphere to render them both inactive, the movement of the movable means incident to fluid pressure acting upon a surface thereof causing the said other of said valve parts to move relative to the locating element to restrict the flow of fluid to the active fluid chamber and thereby causing the movable means to follow the locating element, and conduit means movable with one of the surfaces of the movable means for connecting the valve means in fluid communication with the fluid source.

7. A follower mechanism governed by fluid pressure from a fluid source comprising, in combination, fluid operated means having two fluid chambers, movable means having two surfaces in which a surface is exposed to the fluid pressure in each of the fluid chambers, a follower valve casing comprising a rotor having annularly disposed port means, a locating valve element turnably mounted in the rotor and having fluid control means in cooperation with the said port means for regulating the flow of the fluid from the said source to the chambers and from the chambers to atmosphere, said rotor being mechanically connected to and movable with the movable members, said valve parts under a first set of relative conditions between the two parts admitting fluid to one of said fluid chambers and rendering it active to operate the movable means in one direction while venting the other fluid chamber to atmosphere and under a second set of relative conditions admitting fluid to the said other fluid chamber and rendering it active to operate the movable means in the opposite direction while venting the said one of said fluid chambers to atmosphere and under a third set of relative conditions venting both of the fluid chambers to atmosphere to render them both inactive, the movement of the movable means incident to fluid pressure acting upon a surface thereof causing the said other of said valve parts to move relative to the locating element to restrict the flow of fluid to the active fluid chamber and thereby causing the movable means to follow the locating element, and conduit means movable with one of the surfaces of the movable means for connecting the valve means in fluid communication with the fluid source.

8. A follower mechanism governed by fluid pressure from a fluid source comprising, in combination, fluid operated means having two fluid chambers, a movable member mounted in each of the fluid chambers and responsive to the pressure of the fluid therein, mechanical means for connecting the two movable members together and causing the movement of one to oppose the movement of the other, valve means having two relatively movable parts for regulating the flow of the fluid from the said source to the chambers and from the chambers to atmosphere, one of said valve parts being a locating element and the other of said valve parts being mechanically connected to and movable with the movable members, said valve parts under a first set of relative conditions between the two parts admitting fluid to one of said fluid chambers and rendering it active to operate the movable means in one direction while venting the other fluid chamber to atmosphere and under a second set of relative conditions admitting fluid to the said other fluid chamber and rendering it active to operate the movable means in the opposite direction while venting the said one of said fluid chambers to atmosphere and under a third set of relative conditions venting both of the fluid chambers to atmosphere to render them both inactive, the movement of the movable means incident to fluid pressure acting upon a surface thereof causing the said other of said valve parts to move relative to the locating element to restrict the flow of fluid to the active fluid chamber and thereby causing the movable means to follow the locating element, and conduit means movable with one of the movable members for connecting the valve means in fluid communication with the fluid source.

THOMAS A. BAKER.